(12) United States Patent
Wada

(10) Patent No.: US 12,217,495 B2
(45) Date of Patent: Feb. 4, 2025

(54) LEARNING PROCESS DEVICE AND INSPECTION DEVICE

(71) Applicant: SYNTEGON TECHNOLOGY K.K., Tokyo (JP)

(72) Inventor: Ken Wada, Tokyo (JP)

(73) Assignee: Syntegon Technology K.K., Tokyo (JP)

( * ) Notice: Subject to any disclaimer, the term of this patent is extended or adjusted under 35 U.S.C. 154(b) by 247 days.

(21) Appl. No.: 17/642,423

(22) PCT Filed: Sep. 16, 2020

(86) PCT No.: PCT/JP2020/035141
§ 371 (c)(1),
(2) Date: Mar. 11, 2022

(87) PCT Pub. No.: WO2021/054376
PCT Pub. Date: Mar. 25, 2021

(65) Prior Publication Data
US 2022/0343640 A1  Oct. 27, 2022

(30) Foreign Application Priority Data

Sep. 17, 2019 (KE) .............................. 2019-168127

(51) Int. Cl.
*G06V 10/82* (2022.01)
*G06T 7/00* (2017.01)
(Continued)

(52) U.S. Cl.
CPC ............ *G06V 10/82* (2022.01); *G06T 7/0004* (2013.01); *G06V 10/7747* (2022.01);
(Continued)

(58) Field of Classification Search
CPC .. G06V 10/82; G06V 10/7747; G06V 10/776; G06T 7/0004; G06T 2207/20081;
(Continued)

(56) References Cited

U.S. PATENT DOCUMENTS

| 11,282,185 | B2 | 3/2022 | Nogami et al. |
| 2006/0257005 | A1* | 11/2006 | Bergeron ............... G01V 5/22 |
| | | | 382/209 |

(Continued)

FOREIGN PATENT DOCUMENTS

| CN | 108710941 A | 10/2018 |
| CN | 108805259 A | 11/2018 |

(Continued)

OTHER PUBLICATIONS

International Search Report for Application No. PCT/JP2020/035141, mailed Oct. 27, 2020, with English translation (5 pages).

(Continued)

*Primary Examiner* — Chan S Park
*Assistant Examiner* — D J Dhooge
(74) *Attorney, Agent, or Firm* — Ice Miller LLP; Justin D. Swindells

(57) ABSTRACT

A learning processing device that is based on a neural network model and image data obtained by capturing an image of the object to be inspected, and constructs the neural network model used for inspecting the object to be inspected. The learning processing device is provided with a learning unit which performs a learning process under a prescribed learning condition on the basis of a list of the image data including a plurality of learning images and constructs the neutral network model. The learning unit embeds unique model identification data in the neural network model, whenever the neural network model is constructed.

4 Claims, 3 Drawing Sheets

(51) Int. Cl.
*G06V 10/774* (2022.01)
*G06V 10/776* (2022.01)

(52) U.S. Cl.
CPC .. *G06V 10/776* (2022.01); *G06T 2207/20081* (2013.01); *G06T 2207/30108* (2013.01)

(58) Field of Classification Search
CPC . G06T 2207/30108; G06T 2207/20084; G06T 7/0008; G06T 2207/10004; G01N 21/90; G01N 2021/8883; G01N 21/8851; G01N 21/9027; G01N 2021/8887; G06N 3/08; G06N 3/045
See application file for complete search history.

(56) References Cited

U.S. PATENT DOCUMENTS

| | | | |
|---|---|---|---|
| 2008/0051957 A1* | 2/2008 | Breed | G06V 20/593 701/36 |
| 2018/0211373 A1* | 7/2018 | Stoppa | G06T 7/55 |
| 2018/0372648 A1 | 12/2018 | Wissmann | |
| 2019/0012579 A1 | 1/2019 | Namiki | |
| 2019/0095760 A1 | 3/2019 | Kudo | |
| 2019/0096135 A1* | 3/2019 | Dal Mutto | G06F 18/24765 |
| 2019/0228522 A1 | 7/2019 | Shinoda et al. | |
| 2019/0318231 A1 | 10/2019 | Wang | |
| 2020/0118263 A1 | 4/2020 | Nogami | |
| 2022/0172348 A1 | 6/2022 | Nogami | |
| 2022/0197306 A1* | 6/2022 | Cella | G06N 3/088 |
| 2024/0161265 A1 | 5/2024 | Nogami | |

FOREIGN PATENT DOCUMENTS

| | | |
|---|---|---|
| CN | 109242820 A | 1/2019 |
| CN | 110678901 A | 1/2020 |
| JP | 2018-198053 A | 12/2018 |
| JP | 2019-505802 A | 2/2019 |
| JP | 2019-061578 A | 4/2019 |
| JP | 2019-087181 A | 6/2019 |
| WO | 2018216629 A1 | 11/2018 |

OTHER PUBLICATIONS

Written Opinion of International Searching Authority for Application No. PCT/JP2020/035141, mailed Oct. 27, 2020; English translation unavailable (4 pages).
International Preliminary Report on Patentability for International Application No. PCT/JP2020/035141, dated Jul. 27, 2021.
Extended European Search Report for EP 20864924, dated Jul. 27, 2023.

* cited by examiner

| Prj. 111 | | | |
|---|---|---|---|
| | | R.U.N. | M.U.N. |
| vsn_PC1 | cmr1 | 010 | 002 |
| | cmr2 | 003 | 001 |
| | cmr3 | 021 | 017 |
| | cmr4 | 004 | 002 |
| vsn_PC2 (w/o A.I.) | cmr1 | 018 | N/A |
| | cmr2 | 013 | N/A |
| | ⋮ | ⋮ | ⋮ |
| vsn_PC10 (w/o A.I.) | cmr4 | 066 | N/A |

FIG. 4

| Prj. 112 | | | |
|---|---|---|---|
| | | R.U.N. | M.U.N. |
| vsn_PC1 | cmr1 | 012 | 003 |
| | cmr2 | 003 | 001 |
| | cmr3 | 022 | 018 |
| | cmr4 | 004 | 002 |
| vsn_PC2 (w/o A.I.) | cmr1 | 018 | N/A |
| | cmr2 | 013 | N/A |
| | ⋮ | ⋮ | ⋮ |
| vsn_PC10 (w/o A.I.) | cmr4 | 066 | N/A |

FIG. 5

LEARNING PROCESS DEVICE AND INSPECTION DEVICE

CROSS-REFERENCE TO RELATED APPLICATIONS

This application is a U.S. National Stage of International Application No. PCT/JP2020/035141, filed Sep. 16, 2020, which is related to and claims the benefit and priority of Japanese Patent Application No. 2019-168127, filed Sep. 17, 2019, the contents of which are incorporated herein in their entireties by reference.

TECHNICAL FIELD

The present disclosure relates to a learning processing apparatus that constructs a neural network model for use in an inspection, and to an inspection apparatus having a learning processing function.

BACKGROUND

Inspection apparatuses that employ captured images of an inspection target for inspection have been known. For example, inspection apparatuses that inspect, based on images, presence of cracks in drug containers or foreign matter within containers during manufacture of contained drugs are known. Software for such an inspection employs, for example, rule-based image recognition, and has a function to control inspection processing conditions including a processing procedure for executing a predetermined inspection and parameters to be set. In the drug industry, for example, to comply with guidelines defined for drug manufacturers according to Good Manufacturing Practice (GMP), it is required that the software should be able to confirm whether a created and verified inspection processing condition is identical to the inspection processing condition used for manufacturing the drug, and whether the inspection processing condition is also effective.

Meanwhile, inspection apparatuses employing neural networks have been put into practice in recent years. Patent Document 1, for example, discloses an inspection apparatus that employs an input image which is a cut out portion of an inspection image obtained by photographing an inspection target. Specifically, an inspection mark that affects an inspection result of the input image is embedded in the input image in accordance with the cut-out location of the input image in the inspection image, and the input image having the inspection mark embedded therein is input to a neural network. The inspection apparatus then determines the inspection result of the input image based on the output of the neural network.

Patent Document 2 discloses an image inspection apparatus that trains a neural network based on a learning image including an inspection target to construct a trained neural network that outputs a feature amount of the learning image. An identifier that determines the quality of the inspection target based on the feature amount of the learning image output by the trained neural network is generated by learning. Then, a determination image including the inspection target is input to the trained neural network and the feature amount of the determination image is output, and the feature amount of the determination image is further input to the identifier to determine the quality of the inspection target.

CITATION LIST

Patent Literature

[Patent Document 1] JP 2019-505802 A
[Patent Document 2] JP 2019-87181 A

SUMMARY

Technical Problem

When a neural network is used in place of the inspection method that employs rule-based imaging recognition as described above, a user cannot understand the structure of a neural network model of the neural network. In this case, it is not easy to verify whether the created and verified neural network model and the neural network model used for inspection are identical, or whether the neural network model is effective.

Solution to Problem

In accordance with an aspect of the disclosure, a learning processing apparatus for constructing a neural network model for use in inspection of an inspection target based on image data obtained by capturing an image of the inspection target and the neural network model, includes a learning unit configured to execute learning processing under predetermined learning conditions based on a list of image data including a plurality of learning images to construct a neural network model. The learning unit is configured to embed unique model identification data in the neural network model which is constructed, each time the learning unit constructs the neural network model.

In accordance with a further aspect of the disclosure, an inspection apparatus for inspecting an inspection target according to a data file of preset inspection processing conditions, includes a learning unit configured to execute learning processing under predetermined learning conditions based on a list of image data including a plurality of learning images to construct a neural network model, a processing condition setting unit configured to generate the data file of inspection processing conditions to which the constructed neural network model is applied; and an inspection unit configured to determine a defect of the inspection target based on image data obtained by capturing an image of the inspection target and the neural network model, according to the data file of inspection processing conditions. The learning unit is configured to construct the neural network model with unique model identification data assigned thereto, each time the learning unit constructs the neural network model, and the processing condition setting unit is configured to generate the inspection processing condition data with unique condition identification data assigned thereto, each time a neural network model to be applied is changed.

Advantageous Effects of Invention

As described above, the learning processing apparatus according to the present disclosure that constructs a neural network model for use in inspection of an inspection target with the neural network model enables easy verification that a created and verified neural network model, and a neural network model that is used during the inspection, are identical.

BRIEF DESCRIPTION OF DRAWINGS

FIG. 4 is an explanatory view illustrating a data file of model identification data and condition identification data before change of the data set.

FIG. 5 is an explanatory view of a data file of model identification data and condition identification data after change of the data set

DESCRIPTION OF EMBODIMENTS

Figure 1:
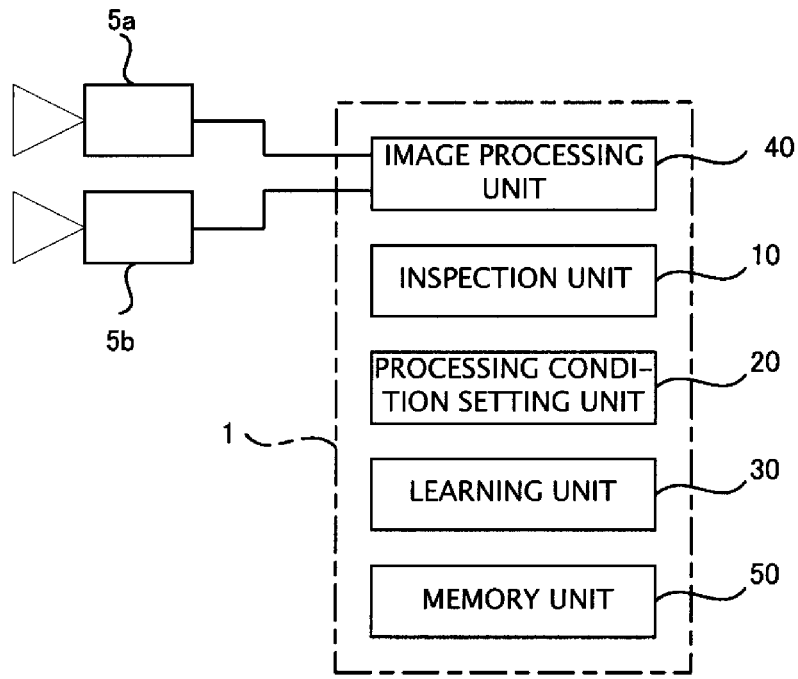
FIG. 1 is a block diagram illustrating an example configuration of an inspection apparatus according to an embodiment of the disclosure.

An embodiment of the disclosure will be described by reference to the attached drawings. In the present specification and the drawings, elements having substantially the same functions and configurations are designated with the same reference numerals, and will not be described repeatedly.

1. Entire Configuration of Inspection Apparatus

An example entire configuration of an inspection apparatus according to the present embodiment will be first described. The inspection apparatus according to the present embodiment is incorporated into part of an operation line of an inspection process for drugs in containers, for example, to inspect an inspection target based on a neural network. The neural network is not limited to any particular type. The inspection apparatus inspects the presence of damage such as cracks and splits in containers, and the presence of foreign matter within containers. The container may be an ampule, a vial, a bottle, a carpule, or a syringe, for example, but is not limited to these examples The inspection apparatus includes at least a processor and a memory device. The processor includes, for example, an image processor such as a GPU (Graphics Processing Unit) and an operation processor such as a CPU (Central Processing Unit). The memory device includes one or more storage media including an HDD (Hard Disk Drive) and a CD (Compact Disc), a DVD (Digital Versatile Disc), an SSD (Solid State Drive), a USB (Universal Serial Bus) flash, and a storage device.

FIG. 1 schematically illustrates a configuration of an inspection apparatus 1 according to the present embodiment. The inspection apparatus 1 includes an image processing unit 40, an inspection unit 10, a processing condition setting unit 20, a learning unit 30, and a memory unit 50. Some or all of the image processing unit 40, the inspection unit 10, the processing condition setting unit 20, and the learning unit 30 are functions that can be implemented by execution of programs by the processor. Some or all of the image processing unit 40, the inspection unit 10, the processing condition setting unit 20, and the learning unit 30 may be an updatable unit such as a firmware, and may be, for example, a program module that is executed according to instructions from the processor. The memory unit 50 is a function that is executed by the memory device described above.

The learning unit 30 forming the inspection apparatus 1 is an element that functions as a learning processing apparatus, and may be an independent processing device having a partial function including that of the learning unit 30.

Imaging devices 5a and 5b are coupled with the inspection apparatus 1 for capturing images of containers with drug that are continuously conveyed. The imaging devices 5a and 5b may be, for example, a wide-angle CCD (Charge Coupled Device) camera or a line sensor camera. While FIG. 1 illustrates two imaging devices 5a and 5b, the number of imaging devices may be one, or three or more. The inspection apparatus 1 may further include an illumination device that illuminates the inspection target with light and a microscope that visually enlarges the inspection target. The inspection apparatus 1 may further include an image display monitor and a speaker, for example. The image display monitor displays image information and text to enable an operator to confirm the inspection status, for example. The image display monitor may be a touch panel that receives an operator's operation input. The speaker issues guidance for an inspection procedure and raises an alarm upon detection of a defect in a container with a drug, for example.

Inspection may be performed for detecting foreign matter within a container filled with a liquid drug while the container is being conveyed, for example. In this case, capturing an image of the container with a drug that has reached an inspection station while rotating the container allows detection of the state of the container, and capturing an image of the drug within the rotating container, allows detection of foreign matter within the drug. For example, in each of a plurality of inspection stations, a plurality of imaging devices inspect a container with a drug.

The image processing unit 40 acquires a captured image captured by the imaging devices 5a and 5b, and stores the acquired captured image in the memory unit 50. When storing the captured image in the memory unit 50, the image processing unit 40 may perform image processing suitable for inspection with respect to the captured image. For example, the image processing unit 40 may cut out a portion of the captured image corresponding to the range of the inspection target. The image processing unit 40 may also perform processing such as data compression, normalization, and extension with respect to the captured image.

The learning unit 30 performs training (deep learning) of a neural network using the captured image. Specifically, the learning unit 30 learns defect-free images and images with various defects obtained under a predetermined inspection condition to construct a neural network model.

The processing condition setting unit 20 creates a data file of inspection processing conditions of the inspection target. The data file of inspection processing conditions refers to a data file of a collection of inspection processing procedures and inspection condition parameters. In inspections that employ conventional rule-based image recognition processing, inspections are performed based on a data file of predetermined inspection conditions, and the inspection conditions for each inspection are stored along with image data captured by each imaging device, for example. When a neural network model is constructed by learning, an inspection condition data file corresponding to the constructed neural network model is generated from the inspection conditions regarding images used for the learning.

A user executes an inspection according to the inspection processing conditions that are set. The inspection unit 10 performs an inspection of the inspection target with a trained neural network model. For example, the inspection unit 10 inputs an image of the inspection target in a neural network model, and performs an inspection of the inspection target based on the output. The neural network model that is used has been formed by learning under the inspection processing conditions that are set.

The inspection unit 10 may be configured to perform inspections based on the conventional rule-based image recognition processing in combination with an inspection based on the neural network model. The inspection apparatus 1 according to the present embodiment which will be described below is configured to be executable of an inspection based on the conventional rule-based image recognition processing, in addition to an inspection based on a neural network model.

2. Inspection Processing Example

An example of inspection processing according to an inspection procedure included in a data file of the inspection processing condition will be described.

Figure 2:
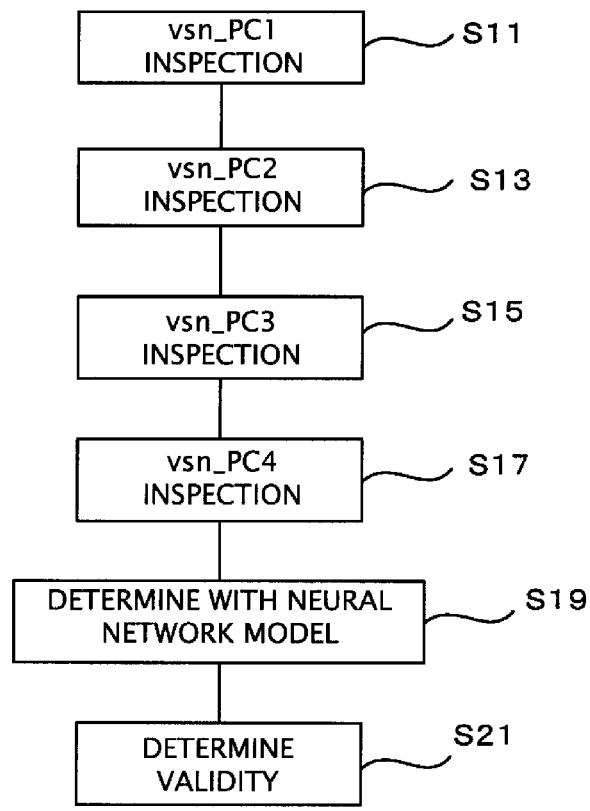
FIG. 2 is an explanatory view illustrating an example inspection processing procedure.

FIG. 2 illustrates an example inspection processing. According to the inspection procedure illustrated in FIG. 2, in step S11 to step S19, inspection units vsn_PC1 to vsn_PC4 perform inspection processing under respective set conditions, and thereafter determination is made using a neural network model. Then, in the following step S21, a defect of an inspection target is determined. Among these steps, in steps S11 to S17, inspection processing that employs rule-based image recognition processing, for example, is performed, and in step S19, inspection processing that employs a neural network model is performed.

When an inspection target is a bottle-shaped container, the following processing is performed in step S11 to step S17. Specifically, a condition is set to enable optical determination of whether a large flaw is present in a portion of the container which is prone to cracks, such as a shoulder or neck of the container, or whether foreign matter is present within the container, and an inspection is performed. Then, determination is made based on an image obtained as a result of the inspection, for example. In each of step S11 to step S17, a predetermined inspection is performed while changing between the imaging devices 5a and 5b to image a container to be inspected or changing the amount of exposure, spectrum, or exposure time of light to be emitted from the illumination device, according to setting of a data file of the inspection processing conditions. In step S11 to step S17, the conventional rule-based detection of an outer appearance of the container or the presence of foreign matter within the container is performed based on the obtained image data.

The inspection processing conditions in the respective inspections and the images obtained in the respective inspections in step S11 to step S17 are stored in the memory unit 50 in association with the corresponding inspections in step S11 to step S17.

In step S19, the outer appearance of the container or the presence of a defect in the container is determined with a neural network model. In step S19, similarly, each of images of a plurality of containers that are inspected is input to a neural network model according to the setting in the data file of inspection processing condition, and the presence of flaws in the container and the presence of foreign matter within the container is inspected based on the output. Specifically, an image of the container obtained by one inspection is input to a neural network model prepared for that inspection, so that a determination result regarding a defect such as a flaw that is an inspection result for that inspection can be obtained. Then, for each inspection, a data file of the inspection processing conditions that is used is stored in association with a neural network model that is used.

In step S21, the quality of the inspection target is determined from the determination results in step S11 to step S19. It is possible, for example, to determine, as a failure, a container that is determined to have a defect based on either the determination result in steps S11 to S17 or the determination result in step S19, or both of the determination results. As conventionally known techniques are applicable to the processing performed in each of step S11 to step S21, detailed description of the processing will be omitted.

Regarding the inspection processing with a neural network model performed in step S19, the inspection apparatus 1 according to the present embodiment stores the data file of inspection processing conditions along with model identification data of the neural network model and condition identification data of the data file of inspection processing conditions. The model identification data is assigned to a neural network model when the neural network model is constructed by learning. Specifically, different identification data that is difficult to rewrite is assigned to each of different data sets used for learning the neural network. Then, in step S19, the model identification data of the neural network model used for the inspection processing is stored in association with the corresponding inspection. Therefore, at the end of the inspection, the model identification data of the neural network model that is used has been stored for each inspection, and this enables verification of the neural network model used for inspection processing.

For each neural network model, an image data list and setting parameters used for constructing the neural network model are stored. This configuration enables the user to specify the neural network model from the model identification data upon user's detection of some faults in image recognition, which further enables tracking of the image data list and setting parameters used for learning the neural network. It is therefore possible to verify validity of the neural network model for an inspection to be performed.

3. Learning Processing Operation and Setting Processing Operation for Inspection Processing Conditions Operation examples of neural network learning processing and inspection processing condition setting processing to be performed by the inspection apparatus 1 will be now described.

Figure 3:
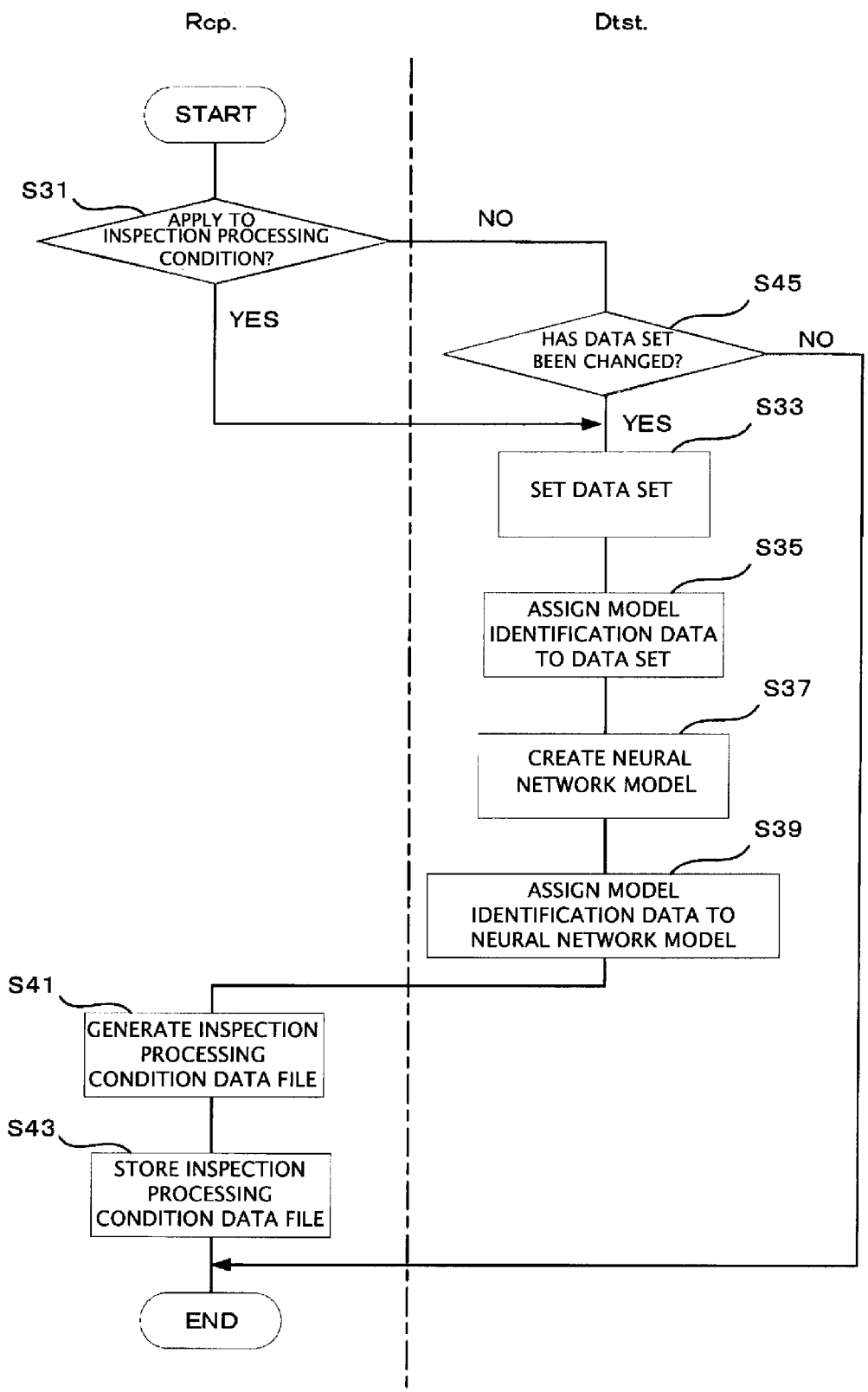
FIG. 3 is a flowchart illustrating an example operation of neural network learning processing and inspection processing condition setting processing.

FIG. 3 is a flowchart illustrating an operation example of neural network learning processing and inspection processing condition setting processing. FIG. 3 illustrates, on the left half, an operation regarding setting of an inspection processing condition (recipe: Rcp), and illustrates, on the right half, an operation regarding a data set (Dtst) for use in creating a neural network model.

First, the processing condition setting unit 20 of the inspection apparatus 1 detects, based on user input, application of a neural network model to a specific inspection processing condition (YES in step S31). More specifically, a neural network model is constructed by learning, and also a data file of inspection processing conditions to be applied to the constructed neural network model is generated.

Subsequently, the learning unit 30 sets a learning data set for a neural network (step S33). The learning data set refers to a list of image data for use in learning for a neural network, and data of setting parameters for use in learning. The setting parameters are parameters such as a depth and learning rate of deep learning for a neural network, and error functions, for example. The list of image data may be selected arbitrarily from the image data stored in the memory unit 50 or may be designated by the user. Specifically, image data have been stored regarding results of inspections performed under specific inspection conditions, as examples with or without defects, and, based on these data sets, a neural network model would be constructed.

For example, at the start of learning, 50% of the stored image data may be arbitrarily extracted for learning to thereby create a neural network model, and thereafter, the remaining 50% of the image data may be input to the created neural network model for verification of the model. If an error is detected by such verification, the corresponding image data may be manually added as learning image data. Alternatively, when there are any foreign matter or container defects that cannot be detected with a neural network model suitable for manufacturing of a container with a drug, the image data of the container may be newly registered in a data set to enable learning of the image data.

The learning unit 30 then assigns the model identification data to the data set that has been set (step S35). The model identification data that is assigned is identification data that is difficult to rewrite, and is individually assigned to each of data sets that are only partially different. The learning unit 30, upon changing the list of image data or setting parameters for use in learning at least partially, always assigns different model identification data to the data set to thereby enable discrimination among different data sets. The model identification data thus specifies the neural network model and the data set used for constructing the neural network model. The model identification data may be binary data, for example. The use of binary data enables identification data that is distinguishable from identification data of other data sets to be easily incorporated into a data set, as identification data that is difficult to rewrite.

The learning unit 30 further performs learning of a neural network to create a neural network model (step S37). The learning unit 30 performs learning of the neural network while classifying the image data, for example. The image data may be classified, for example, according to the state of a container having cracks, the state of a container being chipped, the state of a container containing foreign matter, and the extent of these states. The applicable neural network types and their learning methods are not limited to specific types and methods, and an appropriate neural network or learning method is selected in accordance with the content of an inspection.

The learning unit 30 then assigns the model identification data to the neural network model that is created (step S39). In this example, the same identification data as the model identification data that has been assigned to a data set is assigned to the neural network model. When a neural network model is created with the data set being unchanged, a hash value would be different. However, the same identification data (binary data in the present embodiment) would be assigned as the model identification data for the same data set. Meanwhile, when the data set is changed at least partially, different model identification data would be assigned to the neural network model.

Subsequently, the processing condition setting unit 20 applies the created neural network model to a data file of inspection processing conditions (step S41). Specifically, the neural network model that is created is applied as a neural network model for use in inspection processing employing the neural network. More specifically, a data file of the inspection processing conditions corresponding to the neural network model that is created is generated from the inspection processing conditions corresponding to the data set used for constructing the neural network model.

When a new neural network model is created, the inspection unit 10 may verify validity of the neural network model prior to application of the neural network model to a data file of the inspection processing condition. This configuration enhances reliability of an inspection employing the neural network model.

The processing condition setting unit 20 then assigns condition identification data to the data file of inspection processing conditions that is generated and stores the data file of inspection processing conditions (step S43), thereby terminating the processing. As the condition identification data, different values are assigned to the data files of inspection processing conditions with different model identification data of the neural network models. The condition identification data, similar to the model identification data, is identification data that cannot be easily rewritten. The condition identification data may be binary data, for example.

Here, in response to NO in the determination in step S31, the learning unit 30 determines whether or not a data set has been changed (step S45). Specifically, the learning unit 30 determines whether or not the user has added the learning image data or has added or changed the setting parameters. In response to the determination that the data set has not been changed (S45/No), the learning unit 30 maintains the neural network model and the data file of the inspection processing condition that are stored, and terminates the processing. In response to the determination that the data set has been changed (S45/Yes), the learning unit 30 returns the process to step S35, and creates a new neural network model and a data file of inspection processing condition. At this time, the learning unit 30 assigns new model identification data and new condition identification data to the neural network model and the data file of inspection processing conditions, respectively.

As the processing in steps S31 to S45 is continuously repeated, a new neural network model and data file of inspection processing conditions are generated in response to a user input or a change of the data set.

FIG. 4 and FIG. 5 are tables for explaining the model identification data and the condition identification data before and after a change of the data set. FIG. 4 shows a data file of the model identification data and the condition identification data before a change of the data set, and FIG. 5 shows a data file of the model identification data and the condition identification data after a change of the data set. In FIG. 4 and FIG. 5, the data files are designated with project file numbers (Prj) "111" and "112", respectively.

In the examples illustrated in FIGS. 4 and 5, the first inspection unit vsn_PC1 uses a list of image data captured by each of a first imaging camera cmr1, a second imaging camera cmr2, a third imaging camera cmr3, and a fourth imaging camera cmr4 to perform an inspection based on a neural network model. Further, each of the second inspection unit vsn_PC2 to the tenth inspection unit vsn_PC10 uses a list of image data captured by at least one of the first imaging camera cmr1, the second imaging camera cmr2, the third imaging camera cmr3, and the fourth imaging camera cmr4 to perform an inspection based on conventional rule-based imaging recognition processing.

For each of the inspections performed by each of the inspection units vsn_PC1 to vsn_PC10 with a list of image data captured by each of the first imaging camera cmr1, the second imaging camera cmr2, the third imaging camera cmr3, and the fourth imaging camera cmr4, a data file of inspection processing conditions is generated. In FIG. 4, for example, "010", "003", "021", "004", "018", "013", . . . and "066" are assigned to the data files, respectively, as condition identification data (R.U.N.) of the corresponding data files of inspection processing conditions.

Regarding inspections employing the neural network models, the neural network models applied to the respective inspection processing conditions are designated with model identification data (M.U.N.) "002", "001", "017", and "002", respectively.

Here, assuming that a data set for creating a neural network model with a list of image data captured by the first imaging camera cmr1 and the third imaging camera cmr3 is changed, the model identification data (M.U.N.) of the neural network model that is created is updated to "003" and "018", respectively, as indicated in FIG. 5. Further, the condition identification data (R.U.N.) that is identification data of the data file of inspection processing conditions applied to the neural network model is updated to "012" and "022", respectively.

As described above, in the inspection apparatus 1 according to the present embodiment, the learning unit 30 creates a neural network model with the model identification data that is difficult to rewrite being assigned thereto, every time part of the data set for creating the neural network model is changed. Further, the processing condition setting unit 20 assigns the condition identification data that is difficult to change to the inspection processing conditions to which a neural network model having different model identification data is applied, and generates a data file of the inspection processing conditions. This configuration enables a user, who feels that there is deficiency in the result of an inspection based on image recognition with a neural network model, to track the list of image data or the setting parameters used for creating the neural network model and the creation time of the neural network model.

Specifically, in each inspection project, the condition identification data, and, when a neural network model is used, the model identification data, are stored for each camera of the inspection unit. This configuration facilitates verification of the network model used for determination and the corresponding inspection conditions. Further, as the condition identification data is changed with a change of the network model, the data set corresponding to the network model can also be reliably verified.

For rule-based inspections to be performed without a neural network model, a data file of inspection processing conditions is also generated corresponding to each inspection, and is stored with corresponding condition identification data. At this time, condition identification data different from the condition identification data that is generated for an inspection based on a neural network model is assigned, although the same inspection processing condition is used until the imaging process.

As such, different condition identification data are assigned to inspection processing condition data files for inspection between an inspection not based on a neural network model and an inspection based on a neural network model. Further, when different neural network models are used, different condition identification data are assigned for respective inspection processing condition data files.

Regarding the vsn_PC2 in FIGS. 4 and 5, for example, the condition identification data (R.U.N.) is assigned to the inspection processing condition data file of each inspection. If determination is made using a neural network model in the vsn_PC2, different condition identification data (R.U.N.) corresponding to the model would be assigned.

This configuration enables a user who cannot understand the content of the neural network to verify, based on the model identification data or the condition identification data, whether or not a neural network model used for an inspection is the same as a model used for creating and verifying the neural network model or to verify validity, such as effectiveness, of the neural network model.

As the model identification data and the condition identification data that are assigned are difficult to rewrite, such as binary data, the possibility of tampering of the neural network model or the data file of inspection processing conditions that has been created is lowered, which increases reliability of validity of the neural network model.

Further, the model identification data is assigned to each neural network model that is created and the condition identification data is assigned to each data file of inspection processing conditions. This facilitates selection of a neural network model to be used, in accordance with the inspection environment, such as when a container or the content within a container has been changed.

While the embodiment of the disclosure has been described in detail with reference to the drawings, the present disclosure is not limited to the above example. It is obvious to a person with ordinary knowledge in the technical field of the present disclosure that various modification or correction examples may be conceived of within the scope of technical idea described in the claims, and it is naturally understood that these modification or correction examples fall within the technical scope of the present disclosure.

For example, in the above embodiment, the inspection apparatus 1 includes the inspection unit 10, the processing condition setting unit 20, the learning unit 30, and the image processing unit 40 that are formed by a single computer. However, the present disclosure is not limited to this example, and each, or two or more, of the inspection unit 10, the processing condition setting unit 20, the learning unit 30, and the image processing unit 40 may be formed by a plurality of computer devices that are communicable with each other.

REFERENCE SIGNS LIST 1 inspection apparatus, 10 inspection unit, 20 processing condition setting unit, 30 learning unit, 40 image processing unit.

The invention claimed is:

1. A learning processing apparatus for constructing a neural network model for use in inspection of an inspection target based on image data obtained by capturing an image of the inspection target and the neural network model, the learning processing apparatus comprising:
a learning unit configured to execute learning processing under predetermined learning conditions based on a list of image data including a plurality of learning images to construct a neural network model,
wherein the learning unit is configured to assign, when the list of image data or the learning conditions is at least partially changed, unique model identification data to a combination of the list of image data and the learning conditions in which the list of image data or learning conditions is changed and embed the unique model identification data with respect to a neural network model constructed with the list of image data and the learning conditions, thereby embedding unique model identification data in the neural network model, each time the learning unit constructs the neural network model.

2. The learning processing apparatus according to claim 1, wherein the model identification data is binary data.

3. An inspection apparatus for inspecting an inspection target according to a data file of preset inspection processing conditions, the inspection apparatus comprising:
a learning unit configured to execute learning processing under predetermined learning conditions based on a list of image data including a plurality of learning images to construct a neural network model, a processing condition setting unit configured to generate the data file of inspection processing conditions to which the constructed neural network model is applied; and an inspection unit configured to determine a defect of the inspection target based on image data obtained by capturing an image of the inspection target and the neural network model, according to the data file of inspection processing conditions, wherein the learning unit is configured to assign, when the list of image data or the learning conditions is at least partially changed, unique model identification data to a combination of the list of image data and the learning conditions in which the list of image data or the learning conditions is changed and embed the unique model identification data with respect to a neural network model constructed with the list of image data and the learning conditions to thereby embed unique model identification data in the neural network model each time the learning unit constructs the neural network model, thereby constructing the neural network model with unique model identification data assigned thereto, each time the learning unit constructs the neural network model, and the processing condition setting unit is configured to generate the inspection processing conditions with unique condition identification data assigned thereto, each time a neural network model to be applied is changed.

4. The inspection apparatus according to claim 3, wherein the condition identification data is binary data.

* * * * *

UNITED STATES PATENT AND TRADEMARK OFFICE
CERTIFICATE OF CORRECTION

| | | |
|---|---|---|
| PATENT NO. | : 12,217,495 B2 | Page 1 of 1 |
| APPLICATION NO. | : 17/642423 | |
| DATED | : February 4, 2025 | |
| INVENTOR(S) | : Ken Wada | |

It is certified that error appears in the above-identified patent and that said Letters Patent is hereby corrected as shown below:

On the Title Page

Item (30), Foreign Application Priority Data, please replace:
"Sep. 17, 2019 (KE) ..................... 2019-168127"
With:
--Sep. 17, 2019 (JP) ..................... 2019-168127--

Signed and Sealed this
Ninth Day of September, 2025

Coke Morgan Stewart
*Acting Director of the United States Patent and Trademark Office*